United States Patent
Kawakami et al.

(10) Patent No.: US 11,279,848 B2
(45) Date of Patent: Mar. 22, 2022

(54) POLYSILAZANE COMPOSITION, COATED SUBSTRATE, AND MULTILAYER CONSTRUCTION

(71) Applicant: Shin-Etsu Chemical Co., Ltd., Tokyo (JP)

(72) Inventors: Masato Kawakami, Joetsu (JP); Ayumu Kiyomori, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 383 days.

(21) Appl. No.: 16/555,584

(22) Filed: Aug. 29, 2019

(65) Prior Publication Data

US 2021/0062040 A1  Mar. 4, 2021

(51) Int. Cl.

| | |
|---|---|
| *C09D 183/16* | (2006.01) |
| *C08K 5/5419* | (2006.01) |
| *C09D 5/00* | (2006.01) |
| *C08G 77/62* | (2006.01) |

(52) U.S. Cl.
CPC .......... *C09D 183/16* (2013.01); *C08K 5/5419* (2013.01); *C09D 5/002* (2013.01); *C08G 77/62* (2013.01)

(58) Field of Classification Search
CPC ..... C08L 83/16; C09D 183/16; C08K 5/5415; C08K 5/5419
See application file for complete search history.

(56) References Cited

U.S. PATENT DOCUMENTS

2017/0210944 A1*  7/2017  Grottenmuller ......... C09D 7/67

FOREIGN PATENT DOCUMENTS

| | | |
|---|---|---|
| JP | 9-157528 A | 6/1997 |
| JP | 2010-59302 A | 3/2010 |

* cited by examiner

*Primary Examiner* — Marc S Zimmer
(74) *Attorney, Agent, or Firm* — Birch, Stewart, Kolasch & Birch, LLP

(57) ABSTRACT

A polysilazane composition comprising an organopolysilazane compound free of Si—H structure and an organoxysilane compound having at least two silicon atoms in the molecule does not release hazardous substances such as hydrogen or require reactive solvents.

7 Claims, No Drawings

POLYSILAZANE COMPOSITION, COATED SUBSTRATE, AND MULTILAYER CONSTRUCTION

CROSS-REFERENCE TO RELATED APPLICATION

This non-provisional application herein incorporates by reference in its entirety Patent Application No. 2018-067903 filed in Japan on Mar. 30, 2018.

TECHNICAL FIELD

This invention relates to a polysilazane composition, a coated substrate, and a multilayer construction. More particularly, it relates to a polysilazane composition comprising an organopolysilazane compound and an organoxysilane compound, a coated substrate, and a multilayer construction.

BACKGROUND ART

Polysilazane compounds are a group of compounds which are obtained by ammonolysis polymerization of a chlorosilane compound having at least two chlorine atoms in the molecule. Among the polysilazane compounds, inorganic polysilazanes obtained from dichlorosilane ($H_2SiCl_2$) are widely used. The inorganic polysilazane compound forms a coating through the mechanism that Si—H bonds on the inorganic polysilazane are converted to Si—OH bonds and eventually to Si—O—Si bonds under the impetus of air-borne moisture or oxygen or by heat treatment.

The Si—OH bonds converted from Si—H bonds on the inorganic polysilazane are reactive. When a silicon-based compound is applied so as to act at this site, the Si—OH bonds derived from the inorganic polysilazane form Si—O—Si bonds with the silicon-based compound, by which the silicon-based compound is linked to the coating. That is, by treating a substrate with an inorganic polysilazane as a primer and then with a silicon-based compound having water repellency, the substrate is linked to the water repellent component via the inorganic polysilazane. There is obtained a multilayer construction which exerts water repellent effect for a long time (Patent Document 1).

Also, Patent Document 2 discloses a coating composition comprising an inorganic polysilazane compound dissolved in an alkoxyorganosilane. Since the composition is free of aromatic hydrocarbon solvents such as benzene, toluene and xylene, it does not dissolve polycarbonate resins and acrylic resins. This suggests that these resins may be coated with polysilazane.

CITATION LIST

Patent Document 1: JP-A 2010-059302
Patent Document 2: JP-A H09-157528

SUMMARY OF INVENTION

Patent Documents 1 and 2 use inorganic polysilazanes, which release explosive hydrogen when they react with air-borne moisture to form Si—OH structures. In consideration of outdoor work where metal members can be hot in summer, the release of explosive gas is quite dangerous.

The composition of Patent Document 2 contains a large amount of alkoxysilane as the solvent. When the composition is coated to a substrate, the alkoxysilane can react with air-borne moisture. Then the composition gels to detract from the outer appearance of the substrate.

An object of the invention is to provide a polysilazane composition which does not release hazardous substances such as hydrogen or require reactive solvents, a coated substrate, and a multilayer construction.

The inventors have found that a polysilazane composition comprising an organopolysilazane compound free of Si—H structure and an organoxysilane compound having at least two silicon atoms in the molecule does not release hazardous substances such as hydrogen, and that when a multilayer construction is formed using the composition as a primer, the composition endows the topcoat layer with high durability.

In one aspect, the invention provides a polysilazane composition comprising an organopolysilazane compound comprising repeating units of the general formula (1):

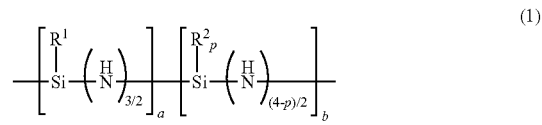

wherein $R^1$ and $R^2$ are each independently a substituted or unsubstituted $C_1$-$C_{20}$ monovalent hydrocarbon group which may contain a heteroatom, p is an integer of 0, 1, 2 or 3, a and b are numbers in the range: $0<a\leq1$, $0\leq b<1$, and $a+b=1$, the organopolysilazane compound having a number average molecular weight of 500 to 100,000 as measured by gel permeation chromatography versus polystyrene standards, and an organoxysilane compound having the general formula (2):

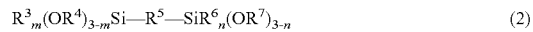

wherein $R^3$, $R^4$, $R^6$ and $R^7$ are each independently a substituted or unsubstituted $C_1$-$C_{20}$ monovalent hydrocarbon group which may contain a heteroatom, $R^5$ is a substituted or unsubstituted $C_1$-$C_{30}$ divalent hydrocarbon group which may contain a heteroatom, and m and n are each independently an integer of 0, 1 or 2.

In a preferred embodiment, the organoxysilane compound having formula (2) is present in an amount of 1 to 50% by weight based on the weight of the organopolysilazane compound having formula (1).

The polysilazane composition may further comprise a solvent and/or a catalyst which contains a metal selected from titanium, aluminum, tin, and zinc.

A primer comprising the polysilazane composition is also provided.

In another aspect, the invention provides a substrate coated with the polysilazane composition.

In a further aspect, the invention provides a multilayer construction comprising the substrate coated with the polysilazane composition and a silicone composition coated on a surface of the substrate. The silicone composition is a silicone emulsion or a condensation curing silicone.

Advantageous Effects of Invention

The polysilazane composition is fully safe because the organopolysilazane compound free of Si—H structure in the molecule does not release explosive hydrogen during working. Also, the polysilazane composition is soluble in inert solvents, minimizing the possibility of erosion of the substrate or gelation. When the polysilazane composition is used as a primer, a silicone composition coated on the primer layer is improved in durability.

DESCRIPTION OF PREFERRED EMBODIMENTS

As used herein, the notation (Cn-Cm) means a group containing from n to m carbon atoms per group.

The invention provides a polysilazane composition comprising an organopolysilazane compound and an organoxysilane compound. The organopolysilazane compound comprises repeating units of the general formula (1) and has a number average molecular weight (Mn) of 500 to 100,000 as measured by gel permeation chromatography (GPC) versus polystyrene standards.

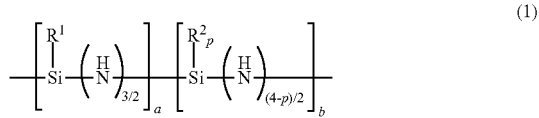

(1)

In formula (1), $R^1$ and $R^2$ are each independently a substituted or unsubstituted monovalent hydrocarbon group of 1 to 20 carbon atoms, preferably 1 to 10 carbon atoms, which may contain a heteroatom.

The $C_1$-$C_{20}$ monovalent hydrocarbon groups represented by $R^1$ and $R^2$ may be straight, branched or cyclic. Examples include straight alkyl groups such as methyl, ethyl, propyl, butyl, pentyl, hexyl, heptyl, octyl, decyl, dodecyl, tetradecyl, hexadecyl, octadecyl and eicosyl; branched alkyl groups such as isopropyl, isobutyl, sec-butyl, tert-butyl, neopentyl, thexyl and 2-ethylhexyl; cyclic alkyl groups such as cyclopentyl and cyclohexyl; alkenyl groups such as allyl, 1-propenyl, butenyl and pentenyl; aryl groups such as phenyl and tolyl; and aralkyl groups such as benzyl and phenethyl.

The monovalent hydrocarbon group may have one or more heteroatoms intervening in the molecular chain, such as ether (—O—) and thioether (—S—) groups.

Also included are substituted forms of the foregoing monovalent hydrocarbon groups in which one or more or even all hydrogen atoms are substituted by other substituents. Suitable substituents include $C_1$-$C_6$ alkoxy groups such as methoxy, ethoxy and (iso)propoxy; halogen atoms such as fluorine, chlorine, bromine and iodine; $C_6$-$C_{10}$ aryl groups such as phenyl and tolyl; $C_7$-$C_{10}$ aralkyl groups such as benzyl and phenethyl; and trialkylsilyl, trialkoxysilyl, dialkylmonoalkoxysilyl and monoalkyldialkoxysilyl groups in which each alkyl or alkoxy moiety has 1 to 6 carbon atoms.

Of the foregoing, $R^1$ and $R^2$ are preferably straight or branched $C_1$-$C_{10}$ alkyl groups, more preferably straight or branched $C_1$-$C_{10}$ alkyl groups, and even more preferably straight $C_1$-$C_6$ alkyl groups. Notably, when a plurality of $R^2$ groups are present, they may be the same or different.

In formula (1), p is an integer of 0, 1, 2 or 3, preferably 1 or 2, more preferably 2. The subscripts a and b are numbers in the range: 0<a≤1, 0≤b<1, preferably 0.1<a<0.9, 0.1<b<0.9, more preferably 0.2<a<0.8, 0.2<b<0.8, and a+b=1.

The polysilazane compound should have a number average molecular weight (Mn) of 500 to 100,000, preferably 500 to 10,000. It is noted that Mn is measured by GPC versus polystyrene standards under the conditions which are described in Example section.

The polysilazane composition further comprises an organoxysilane compound having the general formula (2).

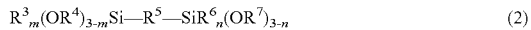

(2)

In formula (2), m and n are each independently an integer of 0, 1 or 2. $R^3$, $R^4$, $R^6$ and $R^7$ are each independently a substituted or unsubstituted $C_1$-$C_{20}$ monovalent hydrocarbon groups, preferably $C_1$-$C_{10}$ monovalent hydrocarbon groups which may contain a heteroatom. $R^5$ is a substituted or unsubstituted $C_1$-$C_{30}$ divalent hydrocarbon group which may contain a heteroatom.

The $C_1$-$C_{20}$ monovalent hydrocarbon groups represented by $R^3$, $R^4$, $R^6$ and $R^7$ are as exemplified above for $R^1$ and $R^2$. Inter alia, the $C_1$-$C_{20}$ monovalent hydrocarbon groups are preferably straight or branched $C_1$-$C_{10}$ alkyl groups, more preferably straight or branched $C_1$-$C_5$ alkyl groups, even more preferably straight $C_1$-$C_3$ alkyl groups, with methyl and ethyl being most preferred.

The substituted or unsubstituted $C_1$-$C_{30}$ divalent hydrocarbon group represented by $R^5$ may be straight, branched or cyclic. Examples of the divalent hydrocarbon group include straight alkylene groups such as ethylene, trimethylene, tetramethylene, hexamethylene, octamethylene and decylene; branched alkylene groups such as propylene (methylethylene) and methyltrimethylene; cyclic alkylene groups such as cyclohexylene; alkenylene groups such as propenylene; arylene groups such as phenylene; and aralkylene groups such as methylenephenylene and methylenephenylenemethylene.

The divalent hydrocarbon group may have one or more heteroatoms intervening in the molecular chain, such as O, S, N, and Si. Two or more heteroatoms may combine to form a ring such as cyclosiloxane. Examples of the divalent hydrocarbon group containing an intervening heteroatom include alkyleneoxyalkylene, alkylenethioalkylene, alkyleneaminoalkylene, alkylenesilylalkylene, and alkylenesiloxysilylalkylene groups. The alkylene moiety in these groups is independently as exemplified above for the straight, branched, and cyclic alkylene groups. The cyclic alkylene groups may contain a heteroatom in the cyclic structure. Examples include furan, pyrrole, pyrrolidine, piperidine, piperazine, triazine, and isocyanurate. To the heteroatom, there may be attached a substituted or unsubstituted $C_1$-$C_{20}$ monovalent hydrocarbon group which may contain an alkoxysilyl group. Such monovalent hydrocarbon groups are as exemplified above for $R^1$ and $R^2$.

Suitable alkoxysilyl-containing substituted or unsubstituted $C_1$-$C_{20}$ monovalent hydrocarbon groups include (trimethoxysilyl)methyl, (trimethoxysilyl)ethyl, (trimethoxysilyl)propyl, (dimethoxymethylsilyl)methyl, (dimethoxymethylsilyl)ethyl, (dimethoxymethylsilyl)propyl, (dimethylmethoxysilyl)methyl, (dimethylmethoxysilyl)ethyl, (dimethylmethoxysilyl)propyl, (triethoxysilyl)methyl, (triethoxysilyl)ethyl, (triethoxysilyl)propyl, (diethoxymethylsilyl)methyl, (diethoxymethylsilyl)ethyl, (diethoxymethylsilyl)propyl, (dimethylethoxysilyl)methyl, (dimethylethoxysilyl)ethyl, and (dimethylethoxysilyl)propyl.

Examples of the heteroatom-containing divalent hydrocarbon group include, but are not limited to, —(CH$_2$)$_3$—O—(CH$_2$)$_3$—, —(CH$_2$)$_3$—S—(CH$_2$)$_3$—, —(CH$_2$)$_3$—NH—(CH$_2$)$_3$—, —(CH$_2$)$_2$—Si(CH$_3$)$_2$—(CH$_2$)$_2$—, —(CH$_2$)$_2$—Si(CH$_3$)$_2$OSi(CH$_3$)$_2$—(CH$_2$)$_2$—, and groups having the following formulae.

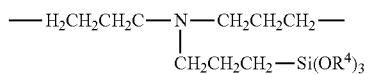

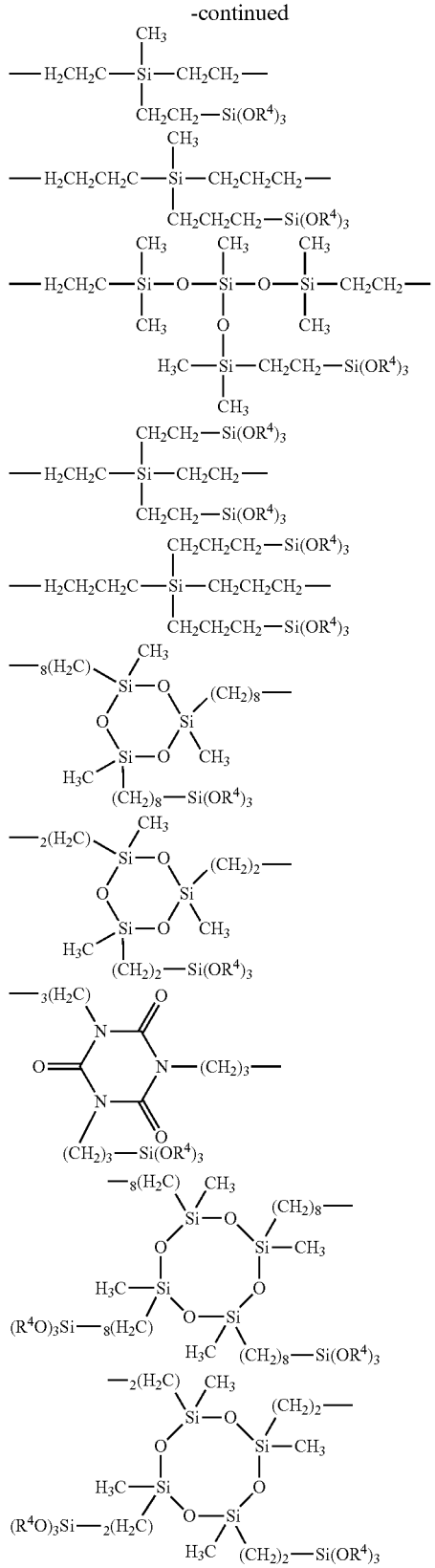

Herein R⁴ is each independently as defined above.

Also included are substituted forms of the foregoing divalent hydrocarbon groups in which one or more or even all hydrogen atoms are substituted by other substituents. Suitable substituents are as exemplified above for $R^1$ and $R^2$.

Examples of the organoalkoxysilane compound having formula (2) include 1,2-bis(trimethoxysilyl)ethane, 1,2-bis(methyldimethoxysilyl)ethane, 1,2-bis(dimethylmethoxysilyl)ethane, 1-(trimethoxysilyl)-2-(methyldimethoxysilyl)ethane, 1-(trimethoxysilyl)-2-(dimethylmethoxysilyl)ethane, 1,6-bis(trimethoxysilyl)hexane, 1,6-bis(triethoxysilyl)hexane, 1,8-bis(trimethoxysilyl)octane, 1,8-bis(triethoxysilyl)octane, bis(trimethoxysilylpropyl)ether, bis(triethoxysilylpropyl)ether, bis(trimethoxysilylpropyl)sulfide, bis(triethoxysilylpropyl)sulfide, bis(trimethoxysilylpropyl)amine, bis(triethoxysilylpropyl)amine, tris(trimethoxysilylpropyl)amine, tris(triethoxysilylpropyl)amine, bis(trimethoxysilylethyl)dimethylsilane, bis(triethoxysilylethyl)dimethylsilane, 1,3-bis(trimethoxysilylethyl)-1,1,3,3-tetramethyldisiloxane, 1,3-bis(triethoxysilylethyl)-1,1,3,3-tetramethyldisiloxane, tris(trimethoxysilylethyl)methylsilane, tris(triethoxysilylethyl)methylsilane, tris(trimethoxysilylpropyl)methylsilane, tris(triethoxysilylpropyl)methylsilane, tris(trimethoxysilylethyldimethylsiloxy)methylsilane, tris(triethoxysilylethyldimethylsiloxy)methylsilane, 1,3,5-tris(trimethoxysilylethyl)-1,3,5-trimethylcyclotrisiloxane, 1,3,5-tris(trimethoxysilyloctyl)-1,3,5-trimethylcyclotrisiloxane, N,N,N-tris(trimethoxysilylpropyl)isocyanurate, tetrakis(trimethoxysilylethyl)silane, tetrakis(triethoxysilylethyl)silane, tetrakis(trimethoxysilylpropyl)silane, tetrakis(triethoxysilylpropyl)silane, 1,3,5,7-tetrakis(trimethoxysilylethyl)-1,3,5,7-tetramethylcyclotetrasiloxane, and 1,3,5,7-tetrakis(trimethoxysilyloctyl)-1,3,5,7-tetramethylcyclotetrasiloxane.

When $R^5$ in formula (2) is an alkyleneaminoalkylene group, the organoxysilane compound of formula (2) is preferably a compound having the general formula (3) in which the amino group or an alcohol substituted on the amino group bonds with the organoxysilyl group in the organoxysilane compound of formula (2) to form a ring structure.

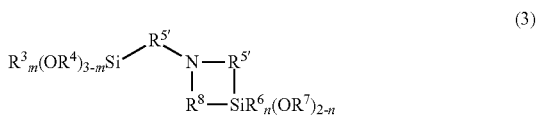

(3)

Herein $R^3$, $R^4$, $R^6$, $R^7$ and m are as defined above, n is an integer of 0 or 1, and $R^{5'}$ is as defined for $R^5$.

In formula (3), $R^8$ is a single bond or a $C_2$-$C_{10}$ divalent hydrocarbon group in which the terminal group closest to the Si atom is substituted with —O—, —S—, —NH— or —C(=O)O—. Suitable $C_2$-$C_{10}$ divalent hydrocarbon groups are as exemplified above for $R^5$. From the aspect of reactivity, $R^8$ is preferably a single bond.

Examples of the compound of formula (3) include 2,2-dimethoxy-1-(3-trimethoxysilylpropyl)-1-aza-2-silacyclopentane, 2,2-dimethoxy-6-(3-trimethoxysilylpropyl)-6-aza-1-silacyclooctane, and 2,2-dimethoxy-6-(3-trimethoxysilylpropyl)-8-methyl-6-aza-1-silacyclooctane.

In the polysilazane composition, the content of the organoxysilane compound of formula (2), though not particularly limited, is preferably 1 to 50% by weight, more preferably 5 to 20% by weight based on the weight of the organopolysilazane of formula (1).

Although the polysilazane composition may be used in solventless form, a solvent may be used. Suitable solvents include $C_5$-$C_{20}$ aliphatic hydrocarbon compounds such as pentane, hexane, cyclohexane, octane, isooctane, nonane, decane, dodecane and isododecane; $C_6$-$C_{10}$ aromatic hydrocarbon compounds such as benzene, toluene and xylene; ether compounds such as diethyl ether, tetrahydrofuran, 4-methyltetrahydropyrane, cyclopentyl methyl ether and dioxane; ester compounds such as ethyl acetate, isopropyl acetate and butyl acetate; aprotic polar compounds such as acetonitrile and N,N-dimethylformamide; chlorinated hydrocarbon compounds such as dichloromethane and chloroform; and siloxane compounds of 2 to 10 silicon atoms such as hexamethyldisiloxane, tris(trimethylsiloxy)methylsilane, octamethylcyclotetrasiloxane and decamethylcyclopentasiloxane, which may be used alone or in admixture of two or more. Inter alia, $C_8$-$C_{12}$ aliphatic hydrocarbon compounds and siloxane compounds of 2 to 8 silicon atoms are preferred from the safety aspect.

The amount of the solvent is not particularly limited. Preferably the solvent is used in such amounts that the concentration of the organopolysilazane compound may be 0.01 to 50% by weight, more preferably 0.1 to 30% by weight, and even more preferably 5 to 20% by weight.

Although the polysilazane composition may be used in the absence of a catalyst, the catalyst is effective for promoting conversion from Si—N bonds to Si—O bonds. A catalyst containing a metal selected from titanium, aluminum, tin, and zinc is preferred. Suitable catalysts include titanium base catalysts, for example, tetraalkyl orthotitanates such as tetrabutyl orthotitanate, tetramethyl orthotitanate, tetraisopropyl orthotitanate and tetra-tert-butyl orthotitanate, and partial hydrolyzates thereof; aluminum base catalysts such as aluminum salts, e.g., aluminum trihydroxide, aluminum alcoholate, aluminum acylate, aluminum acylate, aluminosiloxy compounds and aluminum metal chelate compounds; tin base catalysts such as dioctyltin dioctoate and dioctyltin dilaurate; and zinc base catalysts such as zinc octylate and zinc 2-ethylhexanoate.

Although the amount of the catalyst is not particularly limited, the catalyst is preferably used in an amount of 0.01 to 25% by weight, more preferably 1 to 10% by weight based on the total weight of the polysilazane composition.

The polysilazane composition may further contain one or more additives as long as the benefits of the invention are not impaired. Suitable additives include pigments, defoamers, lubricants, preservatives, pH control agents, film formers, antistatic agents, anti-fungus agents, and dyes.

The method for preparing the polysilazane composition is not particularly limited. The polysilazane composition may be prepared by mixing the organopolysilazane compound of formula (1), the organoxysilane compound of formula (2), and an optional solvent and/or catalyst in any desired order.

Another embodiment of the invention is a substrate using the polysilazane composition. The (coated) substrate is obtained by coating the polysilazane composition to a substrate of inorganic or organic material.

Examples of the inorganic material include metals, glass, metal fibers, glass fibers, powder silica, powder alumina, powder talc, and powder calcium carbonate. Suitable glass is a common type glass, for example, E glass, C glass, AR glass, quartz glass or soda glass. Glass fibers may be used as assemblies, for example, bundles, twisted yarns, and woven fabrics of glass filaments having a diameter of 3 to 30 µm.

Examples of the organic material include rubber, paper, natural fibers such as cellulose, plastics, and resins. Also, an inorganic material having an organic material coated on the surface thereof may be used. Suitable organic materials include rosin, shellac, nitrocellulose, acrylic resins, amino resins, alkyd resins, isocyanate resins, urethane resins, epoxy resins, polyamide resins, polyester resins, polyol resins, and melamine resins. Of these, acrylic resins and alkyd resins are preferred.

Treatment of a substrate with the polysilazane composition may be performed by any commonly used methods. Specifically, the polysilazane composition is coated as such or after dilution with a solvent to the surface of the substrate, and then dried. The coating technique is not particularly limited. Various well-known coating techniques such as brush coating, sponge coating, spray coating, wire bar coating, blade coating, roll coating, and dipping may be used.

In another mode, the polysilazane composition may be contacted with a substrate by carrying the composition on an inert gas and bringing the gas in contact with the substrate. Alternatively, the polysilazane composition may be directly mixed with a substrate using a mixer or mill.

Drying after treatment may also be performed under any desired conditions. The drying step may be performed at a temperature from room temperature to elevated temperature, preferably at room temperature.

A further embodiment of the invention is a multilayer construction using the polysilazane composition as a primer. The multilayer construction is obtained by coating a silicone composition on the surface of the substrate which has been treated with the polysilazane composition or primer by the aforementioned technique. The silicone composition is a silicone emulsion or a condensation curing silicone, having excellent water repellency and water sliding property.

The silicone emulsion refers to an emulsion consisting essentially of silicone oil, water, and surfactant. Although the emulsion may be of either oil-in-water (O/W) type or water-in-oil (W/O) type, the O/W type emulsion is preferred from the aspect of working. Suitable silicone emulsions are commercially available under the trade name of, for example, KM-9770, KM-9717, X-52-8005, and X-51-1302M from Shin-Etsu Chemical Co., Ltd.

The condensation curing silicone refers to a silicone having a hydrolyzable silyl or silanol group which forms a silicone skeleton through hydrolytic condensation with airborne moisture in the presence of a catalyst or at elevated temperature. Suitable condensation curing silicones include methyl-containing silicone oligomers which are commercially available under the trade name of, for example, KC-895, KR-400, KR-515, KR-500, X-40-9225, X-40-9246, and X-40-9250 from Shin-Etsu Chemical Co., Ltd. The catalyst for curing the condensation curing silicone is as exemplified for the catalyst which may be added to the polysilazane composition.

The silicone composition may be coated by the same method as described above for the treatment of a substrate with the polysilazane composition.

EXAMPLE

Examples of the invention are given below by way of illustration and not by way of limitation.

(1) Synthesis of Organopolysilazane Compound

Synthesis Example 1

Synthesis of Organopolysilazane Compound Having Methyl and Hexyl Groups

A flask equipped with a stirrer, reflux condenser, inlet tube and thermometer was charged with 171.0 g (1.323 mol) of dimethyldichlorosilane, 96.9 g (0.442 mol) of hexyltrichlorosilane, and 1027.8 g of toluene. Ammonia was blown from the inlet tube into the reaction solution which was kept below 40° C. After the distillation of ammonia at the top of the reflux condenser was confirmed, the excess ammonia was removed by blowing nitrogen from the inlet tube. The resulting reaction solution was filtered to remove the ammonium chloride. The filtrate was concentrated, yielding 149.9 g of a reaction product.

On IR analysis, the peaks at 3,387 cm$^{-1}$ assigned to NH and at 941 cm$^{-1}$ assigned to Si—N—Si were observed. On GPC analysis, the reaction product had a number average molecular weight (Mn) of 617. These data attested formation of an organopolysilazane compound having methyl and hexyl groups.

The GPC analysis was performed under the following conditions.

Analyzer: LC-20AD (Shimadzu Corp.)
Column: LF-404 (4.6 mm×250 mm) (Shodex)×2
Eluent: tetrahydrofuran (THF)
Flow rate: 0.35 mL/min
Detector: RI
Column oven temperature: 40° C.
Standards: polystyrene (2) Preparation of Polysilazane Composition (Primer Composition)

Comparative Example 1-1

A 50 wt % primer composition was prepared by mixing 10 g of the organopolysilazane in Synthesis Example 1, 1 g of 3-aminopropyltriethoxysilane as a silane compound, and 11 g of IP Solvent 1620 (Idemitsu Kosan Co., Ltd.). Then, 1 g of the primer composition was diluted with 9 g of IP Solvent 1620, yielding a 5 wt % primer composition #1 (designated Primer #1, hereinafter).

Example 1-1

A primer composition #2 (designated Primer #2, hereinafter) was prepared as in Comparative Example 1-1 except that the silane compound was changed to bis(trimethoxysilylpropyl)amine.

Example 1-2

A primer composition #3 (designated Primer #3, hereinafter) was prepared as in Comparative Example 1-1 except that the silane compound was changed to tris(trimethoxysilylpropyl)amine.

Example 1-3

A primer composition #4 (designated Primer #4, hereinafter) was prepared as in Comparative Example 1-1 except that the silane compound was changed to 2,2-dimethoxy-1-(3-trimethoxysilylpropyl)-1-aza-2-silacyclopentane.

Comparative Example 1-2

A primer composition #5 (designated Primer #5, hereinafter) was prepared as in Comparative Example 1-1 except that the organopolysilazane was changed to tetraethoxysilane.

Example 1-4

A primer composition #6 (designated Primer #6, hereinafter) was prepared as in Comparative Example 1-1 except that the silane compound was changed to 1,2-bis(triethoxysilyl)ethane.

Example 1-5

A primer composition #7 (designated Primer #7, hereinafter) was prepared as in Comparative Example 1-1 except that the silane compound was changed to 1,8-bis(triethoxysilyl)octane.

(3) Preparation of Coated Substrate

Examples 2-1 to 2-4 and Comparative Examples 2-1 to 2-4

A galvanized steel plate painted with an amino-alkyd resin enamel was cleaned with nitrogen flow, then washed with water using an abrasive (Bakuhaku One by KeePer Technical Laboratory Co., Ltd.), and dried. A primer composition shown in Table 1 was coated to the plate with wiping cloth (Cotton Ciegal by Chiyoda Co., Ltd.) and wiped with microfiber cloth until evenly distributed.

The primed plate was allowed to stand at room temperature for one hour. A 5 wt % aqueous solution of silicone emulsion (KM-9770 by Shin-Etsu Chemical Co., Ltd.) having excellent water repellency and water sliding property was coated to the primer layer surface with wiping cloth (Cotton Ciegal from Chiyoda Co., Ltd.) and wiped with microfiber cloth until evenly distributed. The plate was allowed to stand at room temperature overnight, obtaining a sample.

The samples were measured for water repellency and durability by the following methods. The results are shown in Table 1.

Water Repellency and Durability Tests

The durability or frictional test was performed by rubbing the sample 400 cycles with wet wiping cloth (Cotton Ciegal from Chiyoda Co., Ltd.) under a load of 500 g. In Tables, "untested" indicates that the test was not performed, and "tested" indicates that the test was performed.

Water repellency was evaluated by measuring a contact angle with water using a contact angle meter (Kyowa Interface Science Co., Ltd.). The samples of Examples 2-2 to 2-4 and Comparative Examples 2-2 to 2-4 were measured for a contact angle with water on the rubbed area.

TABLE 1

|  |  | Primer | Silicone composition | Durability test | Water contact angle (°) |
|---|---|---|---|---|---|
| Example | 2-1 | #2 | KM-9770 | untested | 104 |
|  | 2-2 | #2 | KM-9770 | tested | 100 |
|  | 2-3 | #3 | KM-9770 | tested | 100 |
|  | 2-4 | #4 | KM-9770 | tested | 100 |
| Comparative Example | 2-1 | none | KM-9770 | untested | 105 |
|  | 2-2 | none | KM-9770 | tested | 88 |
|  | 2-3 | #1 | KM-9770 | tested | 92 |
|  | 2-4 | #5 | KM-9770 | tested | 89 |

As seen from Table 1, the primer layer of the polysilazane composition is effective for preventing the silicone emulsion layer from a loss of performance after rubbing and allowing the silicone emulsion layer to maintain water repellency.

Comparative Example 2-2 not using the primer, Comparative Example 2-3 wherein the alkoxysilane added had only one alkoxysilyl group in the molecule, and Comparative Example 2-4 not using the organopolysilazane marked a substantial reduction of contact angle after rubbing, as compared with Examples 2-2 to 2-4, indicating poor water repellency.

(4) Preparation of Multilayer Construction

Examples 3-1 to 3-3 and Comparative Examples 3-1 and 3-2

A galvanized steel plate painted with an amino-alkyd resin enamel was cleaned with nitrogen flow, then washed with water using an abrasive (Bakuhaku One by KeePer Technical Laboratory Co., Ltd.), and dried. A primer composition shown in Table 2 was coated to the plate with wiping cloth (Cotton Ciegal by Chiyoda Co., Ltd.) and wiped with microfiber cloth until evenly distributed.

The primed plate was allowed to stand for one hour. A condensation curing silicone X-40-9250 (Shin-Etsu Chemical Co., Ltd.) having excellent water repellency and water sliding property was coated to the primer layer surface with wiping cloth (Cotton Ciegal by Chiyoda Co., Ltd.) and wiped with microfiber cloth until evenly distributed. The plate was then allowed to stand at room temperature overnight, obtaining a sample.

The durability test was performed as described above in (3) Preparation of coated substrate. The contact angle and sliding angle of water on the corresponding area were measured using a contact angle meter (Kyowa Interface Science Co., Ltd.). The results are shown in Table 2.

TABLE 2

|  |  | Primer | Silicone composition | Durability test | Water contact angle (°) | Water sliding angle (°) |
|---|---|---|---|---|---|---|
| Example | 3-1 | #6 | X-40-9250 | untested | 103 | 30 |
|  | 3-2 | #6 | X-40-9250 | tested | 103 | 27 |
|  | 3-3 | #7 | X-40-9250 | tested | 103 | 30 |
| Comparative | 3-1 | none | X-40-9250 | untested | 103 | 30 |
| Example | 3-2 | none | X-40-9250 | tested | 100 | 57 |

As seen from Table 2, the primer layer of the polysilazane composition is effective for preventing the silicone oligomer layer from losing water sliding property after rubbing or friction.

Japanese Patent Application No. 2018-067903 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A polysilazane composition comprising
an organopolysilazane compound comprising repeating units of the general formula (1):

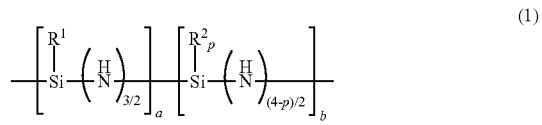

wherein $R^1$ and $R^2$ are each independently a substituted or unsubstituted $C_1$-$C_{20}$ monovalent hydrocarbon group which may contain a heteroatom, p is an integer of 0, 1, 2 or 3, a and b are numbers in the range: $0<a\leq1$, $0\leq b<1$, and $a+b=1$, the organopolysilazane compound having a number average molecular weight of 500 to 100,000 as measured by gel permeation chromatography versus polystyrene standards, and an organoxysilane compound having the general formula (2):

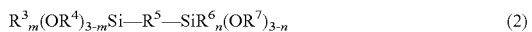

$$R^3{}_m(OR^4)_{3-m}Si-R^5-SiR^6{}_n(OR^7)_{3-n} \qquad (2)$$

wherein $R^3$, $R^4$, $R^6$ and $R^7$ are each independently a substituted or unsubstituted $C_1$-$C_{20}$ monovalent hydrocarbon group which may contain a heteroatom, $R^5$ is a substituted or unsubstituted $C_1$-$C_{30}$ divalent hydrocarbon group which may contain a heteroatom, and m and n are each independently an integer of 0, 1 or 2.

2. The polysilazane composition of claim 1 wherein the organoxysilane compound having formula (2) is present in an amount of 1 to 50% by weight based on the weight of the organopolysilazane compound having formula (1).

3. The polysilazane composition of claim 1, further comprising a solvent.

4. The polysilazane composition of claim 1, further comprising a catalyst which contains a metal selected from titanium, aluminum, tin, and zinc.

5. A primer comprising the polysilazane composition of claim 1.

6. A substrate coated with the polysilazane composition of claim 1.

7. A multilayer construction comprising the substrate of claim 6 and a silicone composition coated on a surface of the substrate, the silicone composition being selected from a silicone emulsion and a condensation curing silicone.

* * * * *